Patented Aug. 18, 1942

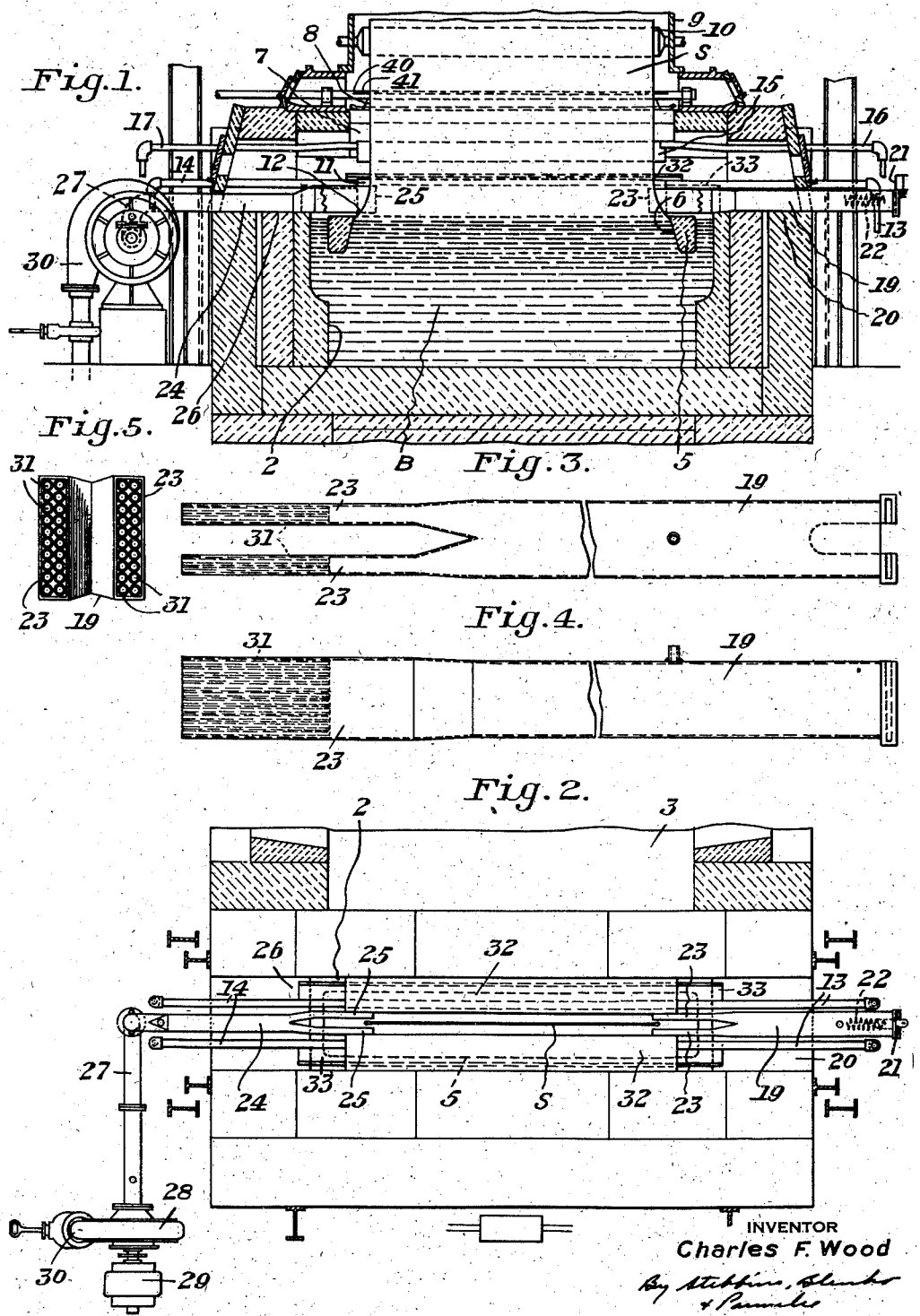

2,293,377

UNITED STATES PATENT OFFICE 2,293,377

MANUFACTURE OF DRAWN GLASS

Charles F. Wood, Jeannette, Pa., assignor to American Window Glass Company, Pittsburgh, Pa., a corporation of Pennsylvania Application November 19, 1938, Serial No. 241,371

4 Claims. (Cl. 49—17)

The present invention relates to the manufacture of sheet glass by substantially continuous drawing from a bath of molten glass. More particularly it relates to and constitutes an improvement upon the methods and apparatus for manufacturing drawn glass shown and described in the copending application of Pete Magrini, Serial No. 205,959, filed May 4, 1938, which issued as Patent No. 2,246,053 June 17, 1941.

In the aforesaid copending application there is shown and described a method and apparatus whereby glass may be continuously drawn from a bath of molten glass without the presence therein of any substantial amount of the waves and batter which have been characteristic of drawn glass for many years. As set forth in said application this result is accomplished by providing a transverse flow of air along the meniscus of the rising glass sheet from one edge thereof to the other edge thereof and in the same direction on both faces of the rising glass sheet. In the carrying out of the method disclosed in said application it is desirable to provide and maintain a very uniform flow of the gas along the meniscus and to prevent any substantial flow of the gases being circulated along the meniscus from passing vertically along the faces of the rising glass sheet. Where any substantial amount of the gas being circulated is not carried from one edge of the rising glass sheet to at least the other edge of the rising glass sheet and passes vertically along the sheet, there is a substantial tendency for this rising gas to create waves in the finished product. Furthermore, where the flow is not of a uniform character and substantially all turbulence eliminated, the irregular or turbulent flow of the gas may result in the formation of what is known as batter in the finished product.

By the present invention I provide a method and apparatus whereby a more uniform flow of gas along the meniscus of the rising glass sheet is obtained and whereby the gas being circulated is more effectively prevented from rising along the glass sheet between the edges. These objects are accomplished by the provision of a laminar flow of the gas just before it passes along the meniscus or transversely of the rising glass sheet adjacent the meniscus. Such a laminar flow sufficient to materially reduce turbulence and to cause the gas being circulated to better stay down at or adjacent the meniscus, can be obtained by providing a plurality of relatively small tubes on the air inlet side of the rising glass sheet and causing at least a portion of the circulated air or gas to pass therethrough.

In the accompanying drawing I have shown for purposes of illustration only a preferred embodiment of my invention.

In the drawing—

Figure 1 is a section through a drawing pit embodying apparatus which I provide;

Figure 2 is a horizontal section through the drawing pit shown in Figure 1;

Figure 3 is a plan view of a tunnel employed for supplying the gas to the pit to be circulated therein;

Figure 4 is a side elevation of the tunnel shown in Figure 3; and

Figure 5 is an end view of the tunnel shown in Figures 3 and 4.

As shown in the drawing, the molten glass in the bath B is fed to the drawing chamber 2 through a canal 3, the drawing chamber 2 being separated from the canal 3 by means of a bridge wall.

A floater or debiteuse 5 is positioned in the drawing chamber 2 and is provided with a longitudinally extending slot 6 through which the glass sheet S is drawn. The floater or debiteuse 5 is held partially submerged in the glass bath by appropriate presser bars (not shown) which cooperate with the four corners thereof. The glass wells upwardly through the slot in the floater and is initially started vertically by means of a bait. The glass sheet S passes upwardly through the drawing chamber 2 between the so-called 49-blocks 7 and between the longitudinally extending angles 8, which are positioned adjacent opposite faces of the rising glass sheet, and then passes into the base of the vertically extending lehr 9. As is well known in the art, the lehr is provided with a plurality of pairs of rolls 10 which carry the sheet vertically therethrough. The lehr 9 is a cooling lehr and is of sufficient length to permit cooling of the glass sheet to a point where it can be manually handled. Adjacent the top of this lehr the rising glass sheet is cut into smaller sheets and these smaller sheets are then taken to the cutting room for further cutting.

The drawing chamber is provided with a pair of main coolers 11 which are located adjacent the meniscus 12 of the rising glass sheet, one of said coolers being provided adjacent each face of the rising glass sheet and extending longitudinally of the drawing chamber throughout the width of the rising glass sheet. These coolers are spaced a relatively short distance above the debiteuse and are so arranged as to be movable toward or away from the rising glass sheet in accordance with the prevailing operating conditions. Appropriate conduits 13 are provided for supplying cooling fluid to the coolers and similar conduits 14 are provided for discharging the cooling fluid from the coolers after it has been circulated therethrough. In accordance with the invention described and claimed in Monro Patent No. 2,002,544, a pair of auxiliary coolers 15 are located in the drawing chamber above the main cooler. These coolers are, in general, smaller than the main coolers but are similar thereto and are positioned on each side of the rising glass sheet and extend longitudinally of the drawing chamber throughout at least the width of the sheet. Conduits 16 are provided for supplying cooling fluid to the coolers 15 and conduits 17 are provided for discharging the cooling fluid therefrom.

Preheated gas is supplied to the drawing chamber at one end thereof by a tunnel 19 resting on the adjacent bridge wall 20. The inlet end of the tunnel is positioned exteriorly of the drawing chamber and this end is open so as to receive either atmospheric air or any other gas which may be fed thereto. A gate 21 is mounted in this end of the tunnel for regulating the flow of gas therethrough. An electric heating element 22 is mounted in the tunnel adjacent the inlet end for preheating to a suitable temperature the gas which is to be fed into the drawing chamber. The discharge end of the tunnel 19 is positioned in the drawing chamber. This end of the tunnel is preferably forked so as to provide for the discharge of the preheated gas on opposite faces of the rising glass sheet and the discharge openings are located adjacent the meniscus so that a relatively uniform flow of the gas along the meniscus and between the coolers and the rising glass sheet can be obtained. Satisfactory results can be obtained where the discharge end of the tunnel 19 is positioned above the meniscus but best results are obtained if the air or gas passing through the tunnel is discharged at or slightly above the meniscus. The forks 23 of the tunnel 19 are spaced apart a sufficient distance to permit them to project a short distance inwardly of the edge of the rising glass sheet although it is not absolutely necessary that they do so.

A somewhat similar tunnel 24 is located at the other end of the drawing chamber. This tunnel has forks 25 which are similar to the forks 23 of the inlet tunnel except for the difference pointed out hereinafter. These forks likewise preferably project inwardly a short distance beyond the edge of the rising glass sheet and are therefore spaced apart a sufficient distance to receive the edge thereof. The tunnel 24 rests upon the breastwall 26 on the discharge or exit end of the drawing chamber. The discharge end of the tunnel 24 is located outside the drawing chamber and is connected by a suitable conduit 27 to an exhaust fan 28 driven by a motor 29. The discharge outlet 30 of the exhaust fan preferably extends through the floor and is connected with the main exhaust system of the factory so as to prevent the discharge of the hot gases into the area adjacent the drawing chamber.

The forks 23 of the inlet tunnel 19 each have a plurality of small tubes 31 positioned therein. A sufficient number of these small tubes (which are preferably approximately about one-half inch in diameter) are positioned in each fork to substantially completely fill the discharge end thereof. These tubes are preferably flush with the discharge end of the fork in which they are mounted and extend toward the inlet opening of the tunnel a sufficient distance, preferably in the neighborhood of 10 inches, to break up the normal flow of the gas through the forks and to provide a plurality of small streams of air entering the drawing pit.

The air which passes into the drawing pit through the tunnel 19 enters in a plurality of small streams and the air then passes longitudinally of the drawing pit along each face of the rising glass sheet at or adjacent the meniscus. By the use of these tubes a very definite unidirectional flow of the gas is obtained, and any turbulence between the edges of the rising glass sheet is substantially eliminated. I believe that the elimination of turbulence is brought about by reason of the fact that the air velocity is more uniform than it would be if the tubes are not used. The gases pass substantially straight across the sheet along or adjacent the meniscus and enter the discharge tunnel 24. In addition to the elimination of turbulence, the use of the tubes 31 through which the gas enters the pit has the effect of keeping the transversely flowing current of air down closer to the meniscus of the glass sheet and prevents it from rising up along the sheet.

Substantially horizontally extending shields 32 are located above each of the main coolers. These shields extend longitudinally of the drawing chamber throughout the width of the rising glass sheet. One end of each shield 32 is supported on the upstanding leg of a heat distributing and cooling retarding angle 33 and the other end thereof is supported on the top of the adjacent cooler and extends inwardly of the cooler toward the rising glass sheet. These shields in conjunction with the coolers provide a passageway through which the transverse circulation of the gas is effected adjacent the meniscus. These shields aid in preventing stray gas currents from striking the rising glass sheet adjacent the meniscus and reduce the amount of air or gas being circulated which may escape upwardly along the rising glass sheet. Where only the shields are employed and the tubes which I provide by the present invention are not used some of the gas will rise along the glass sheet in view of the fact that the shields are spaced from the rising glass sheet. The quantity of gas which does rise along the glass sheet at this point is very substantially reduced by the use of the tubes.

The heat distributing and cooling retarding members 33 are angles which extend longitudinally throughout substantially the entire length of the drawing chamber. These angles aid in the distribution of the heat in the glass in the drawing chamber and also retard the cooling thereof and thereby increase the duration of the drawing period. The angles 33 are mounted on the breastwall a short distance above the glass bath and above the debiteuse. However, they may be placed in various positions in the drawing chamber. For example, they may be placed on the glass bath or on the debiteuse.

In the structure shown in the drawing various operating conditions may be employed. Highly desirable results may be obtained if the entering gas, after it has passed the heater, is at approximately 370° F. Where the incoming gas is at approximately this temperature the temperature of the outgoing gas is generally approximately 540° F. Careful control of the temperature of the preheated gas fed to the chamber is desirable in order to obtain best results. It is also desirable to regulate the quantity of air or gas which is fed to the chamber and circulated along the meniscus. Desirable results can be obtained where the volume of entering gas is from approximately 10 to 30 cubic feet per minute and where the volume of the outgoing gas is approximately 275 cubic feet per minute. The amount of gas fed to the drawing chamber and the amount exhausted therefrom may be appreciably varied. It is desirable, however, to circulate a substantial quantity of gas adjacent the meniscus at a relatively low velocity. If too small a volume is circulated, or if the gas is circulated at too high a velocity, there will be greater opportunity for the formation of eddy currents which will detrimentally affect the character of the product.

Where preheated gas is utilized some difficulty may be encountered in the bowing or warping of the rising glass sheet. To prevent this, longitudinally extending pipes 40 are located in the base of the lehr on opposite faces of the rising glass sheet. Each of these pipes 40 has a longitudinally extending slot 41 therein of a length substantially equal to the width of the rising glass sheet. The pipes and the slots are so positioned that the slots will discharge a curtain of air against the rising glass sheet at an angle of approximately 45°. One end of each of these pipes is capped and the other end extends out of the lehr and is connected to a blower for supplying air, preferably at atmospheric temperature and at a pressure of approximately 3 inches of water.

The product obtained by the use of the present invention is superior to that heretofore produced. The employment of the present invention materially aids in reducing batter and waves to a minimum.

It will be understood that my invention is not limited to the particular apparatus disclosed in the drawing. The laminar flow may be obtained in various other ways and my invention may be applied to machines of various different types and to machines embodying only a portion of the auxiliary apparatus described above and shown in the drawing as employed in the ordinary Fourcault operations. Furthermore, my invention is not limited to the Fourcault method of drawing glass as it may be applied to any of the various types of apparatus heretofore used. My invention may be otherwise embodied or practiced within the scope of the appended claims.

I claim:

1. In the method of forming a glass sheet by continuous drawing from a chamber containing a bath of molten glass, the steps comprising forming the sheet by drawing it vertically from the bath, supplying a gas in a plurality of closely positioned, relatively small streams to positions in the drawing chamber adjacent each face of the rising glass sheet and adjacent the meniscus thereof, and circulating the gas thus supplied to each face in contact with the faces of the glass sheet transversely of the sheet adjacent the meniscus.

2. In the method of forming a glass sheet by continuous drawing from a chamber containing a bath of molten glass, the steps comprising forming the sheet by drawing it vertically from the bath, introducing a plurality of closely positioned streams of pre-heated gas into said chamber adjacent the meniscus of the rising glass sheet and adjacent each face thereof, and circulating the gas thus supplied to each face transversely of the glass sheet from one edge to substantially the other edge adjacent the meniscus and in the same direction on both faces of the sheet.

3. In the method of forming a glass sheet by continuous drawing from a bath of molten glass, the steps comprising forming the sheet by drawing it vertically from the bath, supplying a gas to the chamber on each side of the glass sheet and adjacent one end of the meniscus thereof in a plurality of relatively small, closely positioned streams, and circulating the gas thus introduced in contact with the faces of the glass sheet from one edge thereof toward the other edge thereof adjacent the meniscus while shielding the circulated gas from ingress of stray gas currents and from egress of the circulated gas from adjacent the meniscus during its travel across the rising sheet.

4. Apparatus for drawing sheet glass comprising a drawing chamber having a bath of molten glass therein, means for drawing a continuous sheet of glass vertically from the bath, means including two sets of closely arranged conduits for supplying a gas in a plurality of small, closely positioned streams to said drawing chamber on each face of and adjacent the meniscus of the rising glass sheet, and means for circulating the gas so fed to each face of the sheet transversely of the rising sheet adjacent the meniscus.

CHARLES F. WOOD.